Patented Dec. 21, 1948

2,457,047

UNITED STATES PATENT OFFICE 2,457,047

2-(2'-THENYL)-4,5-DIHYDROIMIDAZOLES AND PROCESS FOR MAKING THE SAME

Lucas P. Kyrides, St. Louis, Mo., assignor to Monsanto Chemical Company, St. Louis, Mo., a corporation of Delaware No Drawing. Application February 13, 1946, Serial No. 647,430

9 Claims. (Cl. 260—309.6)

This invention relates to therapeutic agents and more particularly to novel therapeutic agents containing the thiophene radical.

According to the present invention, generally stated, an ester of 2-thienyl acetic acid and anhydrous ethylenediamine is heated with anhydrous ethylenediamine under reflux conditions with concomitant removal of the corresponding alcohol formed in the reaction from the reaction mixture by fractionation. The reaction mixture is thereafter fractionally distilled at reduced pressure to recover first a fraction of unreacted ethylenediamine and subsequently a fraction of 2-(2'-thenyl)-4,5-dihydroimidazole. The process is desirably repeated on the high boiling residue with the addition of alkyl 2-thienyl acetate and anhydrous ethylenediamine thereto. The combined yields of 2-(2'-thenyl)-4,5-dihydroimidazole are very good.

In place of an ester of 2-thienyl acetic acid in the aforedescribed process, an ester of 5-methyl-2-thienyl acetic acid may be employed and the resulting product is 2-(5'-methyl-2'-thenyl)-4,5-dihydroimidazole. The starting material, 5-methyl-2-thienyl acetic acid, may be prepared by chloromethylating 2-methylthiophene to produce 5-methyl-2-chloromethylthiophene. The chloro compound is then further processed, for example as described in J. A. C. S. 63, 2945 (1941), by reacting the chloro derivative with sodium cyanide to obtain 5-methyl-2-thienyl acetonitrile. The nitrile is then hydrolyzed, for example with caustic soda in aqueous alcohol solution. After the hydrolysis is complete, the reaction mixture is acidified to liberate 5-methyl-2-thienyl acetic acid. This material is then separated, washed and dried. 5-methyl-2-thienyl acetic acid is subsequently esterified, for example with ethyl alcohol in the presence of 1% sulfuric acid.

The novel compounds of the present invention have the formula:

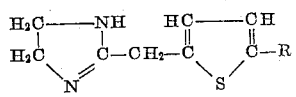

in which R represents hydrogen or a methyl radical.

The compounds have been found to possess marked action on the circulatory system of warm-blooded animals and also to possess significant antimalarial action in vivo. Other therapeutic uses for the compound are likely to be developed. The following examples will serve to illustrate the process for the preparation of the novel compounds of the present invention:

Example I

A mixture of 57 g. (0.363 mole) of methyl 2-thienyl acetate and 110 g. (1.83 moles) of anhydrous ethylenediamine was refluxed for 12 hours while methyl alcohol was removed as formed through a 6-plate column. The excess ethylenediamine was removed by distillation and the 2-(2'-thenyl)-4,5-dihydroimidazole formed in the reaction was then distilled off; B. P. 165–170° C. at 9 mm. Yield, 34 g. To the high boiling residue remaining in the flask there was added 56 g. of methyl 2-thienyl acetate and 140 g. of anhydrous ethylenediamine. The mixture was refluxed for 12 hours with the removal of methyl alcohol as formed. Then the excess ethylenediamine was removed and 120 cc. thereof was added back to the reaction mixture and the mixture was refluxed again for 4 hours. The ethylenediamine was then removed by distillation and the 2-(2'-thenyl)-4,5-dihydroimidazole was distilled off; B. P. 165–170° C. at 9 mm. Yield, 52.8 g. Total yield 86.8 g. (72%).

Example II

A mixture of 62 g. (0.363 mole) of methyl-(5-methyl-2-thienyl) acetate and 110 g. (1.83 moles) of anhydrous ethylenediamine was refluxed for approximately 12 hours during which time methyl alcohol was fractionally distilled from the reaction mixture through a 6-plate column. Subsequently the excess ethylene diamine was removed from the reaction mixture by distillation and the 2-(5'-methyl-2'-thenyl)-4,5-dihydroimidazole formed in the reaction was then distilled off. The residue in the flask was then processed according to the procedure decribed in Example I.

In preparing the novel compounds of the present invention, any ester of 2-thienyl acetic acid or of 5-methyl 2-thienyl acetic acid may be employed, for example the alkyl esters such as the ethyl, propyl, isopropyl, butyl, octyl and dodecyl esters, the aralkyl esters such as the benzyl ester, the cycloalkyl esters such as the cyclopropyl, cyclobutyl or cyclohexyl esters and the aryl esters such as the phenyl ester.

The acid salts of the novel compounds of the present invention are also useful as pharmaceutic agents, for example salts such as the hydrochloride, sulfate, acid sulfate, salicylate, benzoate, phosphate and acetate. These salts may be prepared in aqueous or organic solvent solution by dissolving the novel compounds of the present invention in such solvents and add the ester thereto. Subsequently the solutions may be evaporated and the salts crystallized from the concentrated solutions. The hydrochloride may conveniently be prepared by dissolving the novel compounds of the present invention in organic solvents and passing hydrogen chloride gas into the resulting solutions. The salts thus formed are precipitated from the solution and may be filtered off, washed free from excess acid and dried.

I claim:

1. Compounds having a structural formula of the type:

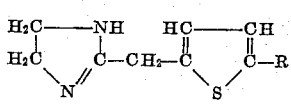

in which R represents a radical selected from the group consisting of hydrogen and methyl, and acid salts thereof.

2. 2-(2'-thenyl)-4,5-dihydroimidazole, having the formula:

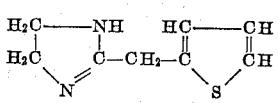

3. 2-(5'-methyl-2'-thenyl)-4,5-dihydroimidazole, having the formula:

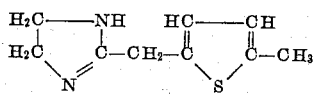

4. A process for preparing a compound of the formula type:

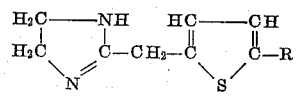

in which R represents a radical selected from the group consisting of hydrogen and methyl, comprising heating a compound of the formula type:

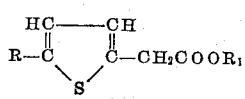

in which R represents a radical selected from the group consisting of hydrogen and methyl and $R_1$ represents a radical selected from the group consisting of alkyl, aralkyl, and aryl radicals, with anhydrous ethylenediamine under reflux conditions with concomitant removal of the alcohol formed in the reaction, and recovering from the reaction mixture a product having a formula of the type hereinabove described.

5. A process for preparing 2-(2'-thenyl)-4,5-dihydroimidazole comprising heating an ester of 2-thienyl acetic acid with anhydrous ethylenediamine under reflux conditions with concomitant removal of the alcohol formed in the reaction, and recovering 2-(2'-thenyl)-4,5-dihydroimidazole from the reaction mixture.

6. A process for preparing 2-(5'-methyl-2'-thenyl)-4,5-dihydroimidazole comprising heating an ester of 5-methyl-2-thienyl acetic acid with anhydrous ethylenediamine under reflux conditions with concomitant removal of the alcohol formed in the reaction, and recovering 2-(5'-methyl-2'-thenyl)-4,5-dihydroimidazole from the reaction mixture.

7. A process for preparing 2-(2'-thenyl)-4,5-dihydroimidazole comprising heating an ester of 2-thienyl acetic acid with anhydrous ethylenediamine under reflux conditions with concomitant removal of the alcohol formed in the reaction, fractionally distilling off unreacted ethylenediamine and subsequently distilling off 2-(2'-thenyl)-4,5-dihydroimidazole.

8. A process for preparing 2-(2'-thenyl)-4,5-dihydroimidazole comprising heating the methyl ester of 2-thienyl acetic acid with anhydrous ethylenediamine under reflux conditions with concomitant removal of methyl alcohol, and recovering 2-(2'-thenyl)-4,5-dihydroimidazole from the reaction mixture.

9. A process for preparing 2-(5'-methyl-2'-thenyl)-4,5-dihydroimidazole comprising heating the methyl ester of 5-methyl-2-thienyl acetic acid with anhydrous ethylenediamine under reflux conditions with concomitant removal of methyl alcohol formed in the reaction, and recovering 2-(5'-methyl-2'-thenyl)-4,5-dihydroimidazole from the reaction mixture.

LUCAS P. KYRIDES.

No references cited.